United States Patent [19]

Lamar

[11] 4,399,864

[45] Aug. 23, 1983

[54] CONTROLLING ROOM-AIR TEMPERATURE AND HUMIDITY IN AN AIR-CONDITIONING SYSTEM

[75] Inventor: Roger H. Lamar, Winston-Salem, N.C.

[73] Assignee: The Bahnson Company, Winston-Salem, N.C.

[21] Appl. No.: 329,302

[22] Filed: Dec. 10, 1981

[51] Int. Cl.³ .................... F24F 3/14; G05D 21/00
[52] U.S. Cl. ................................. 165/20; 236/44 C
[58] Field of Search ............. 236/44 C, 44 R; 165/20, 165/21

[56] References Cited

U.S. PATENT DOCUMENTS

| | | |
|---|---|---|
| Re. 20,944 | 12/1938 | Baker . |
| 1,944,146 | 1/1934 | Howry . |
| 1,986,529 | 1/1935 | Ray . |
| 2,075,036 | 3/1937 | Hollis . |
| 2,149,990 | 3/1939 | Cook . |
| 2,953,355 | 9/1960 | Hungate ............... 165/20 |
| 3,232,029 | 2/1966 | Evans, Jr. . |
| 3,247,679 | 4/1966 | Meckler . |
| 3,812,685 | 5/1974 | Brown . |
| 3,891,027 | 6/1975 | McFarlan ............. 165/20 X |
| 4,089,666 | 5/1978 | Knight . |
| 4,312,189 | 1/1982 | Cotton, Jr. ........... 165/21 X |

OTHER PUBLICATIONS

"Automatic Control of Carrier Rotaspray Units", Honeywell, Inc., 1964, Form 74-5117.
H. Coalson et al., "Air Washer Operation with Non-Saturated Discharge and Controlled Dewpoint Conserves Energy", ASME Proceedings, 1978.

Primary Examiner—William E. Wayner
Attorney, Agent, or Firm—Dann, Dorfman, Herrell & Skillman

[57] ABSTRACT

An air-conditioning system for a work space in which recirculated air is mixed with outside air and the mixture is passed through a washer. The controls for the system include an absolute moisture controller in the primary air supply downstream from the air washer, a direct-acting humidistat for the room air and a reverse-acting thermostat for the room air. The proportional output signals of the thermostat and humidistat are fed to a high-and-low signals selector which transmits the higher of the two signals to a heating control for the recirculated air and the lower of the two signals to a throttling valve for the air washer. In normal operation, the air washer is fully throttled before the heating control is activated to supply heat to the recirculated air since the heating control is responsive to a pressure above the range of pressures which are effective to modulate the washer sprays. Under special conditions, the throttling of the spray in the air washer is reduced after the heating control is activated so as to increase the humidification effected by the air washer.

11 Claims, 1 Drawing Figure

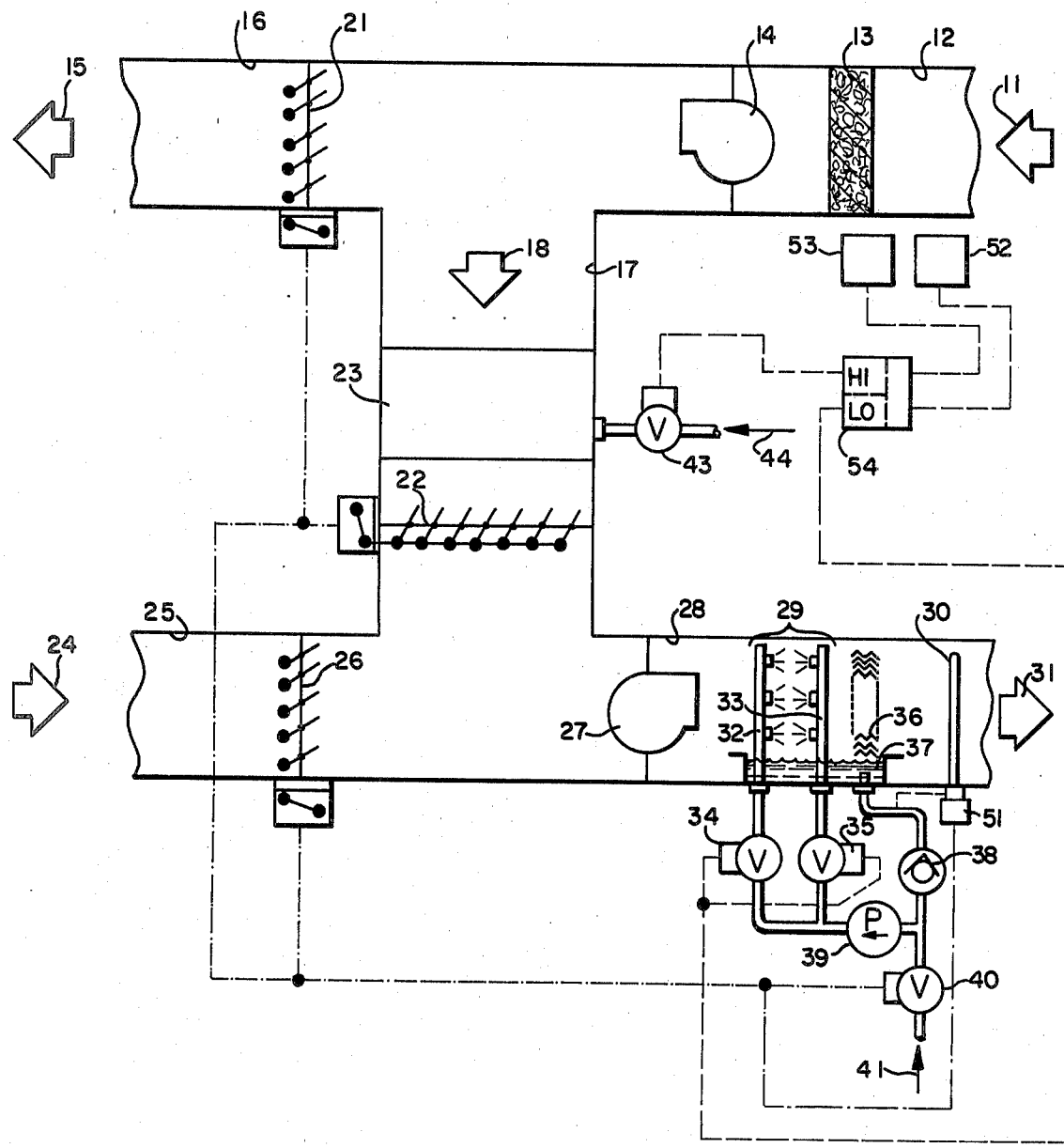

CONTROLLING ROOM-AIR TEMPERATURE AND HUMIDITY IN AN AIR-CONDITIONING SYSTEM

FIELD OF THE INVENTION

The present invention relates to air conditioning systems and more particularly to an air conditioning system in which the room air is partially or entirely recirculated and or mixed with fresh air prior to being washed and humidified for reintroduction into the room. More particularly the present invention relates to an improved control system for regulating the temperature and humidity of the air reintroduced into the room in accordance with the temperature and humidity within the room.

BACKGROUND OF THE INVENTION

One conventional system for controlling the temperature and humidity of the air introduced into the work space in an air conditioned plant consists of reducing the temperature of the air introduced into the work area to a temperature corresponding to the wet bulb temperature desired in the space, saturating the air with moisture at that temperature, and thereafter adding sensible heat to the air so as to elevate the temperature to the dry bulb temperature desired in the space. While such a method facilitates the control of the humidity of the air entering the conditioned space, it uses unnecessary energy when it is necessary to first cool the air to a temperature corresponding to the wet bulb temperature and thereafter reheat the air.

In order to conserve energy, it has been proposed to control the dry bulb temperature and humidity of the air by controlling the temperature of the spray used to wash the air and the quantity of the water used in the spray. For example, see U.S. Pat. No. 4,098,666 in which the air is reconditioned as set forth above and then split into separate flows to treat work material, in this instance tobacco, in two sequential stages.

SUMMARY OF THE INVENTION

The present invention provides a method for providing conditioned air to a work space in an efficient and effective manner wherein sensible heat is added to the air prior to the washing and humidification of the air before its reintroduction into the work space.

More specifically the present invention provides an improved control system in which the air introduced into the work space is a predeterminable mixture of fresh air and secondary air which is subjected to a predetermined humidification prior to introduction into the work space. The mixture of secondary air and fresh air is controlled to insure that the air is a sufficiently low humidity to provide the desired humidity in the work space. Sensible heat is provided to the mixture by heating the secondary air prior to its mixture with primary air.

The present invention provides improved controls so that when the system calls for reduction of fresh air added to the mixture to a minimum, the system operates efficiently to provide the desired humidity and temperature in the work space regardless of the leakage of fresh air into the system in excess of the minimum called for by the controls.

All of the objects of the invention are more fully set forth hereinafter in connection with the description of the preferred embodiment of the invention.

BRIEF DESCRIPTION OF THE DRAWING

A preferred embodiment of the invention is illustrated in the single FIGURE which is a diagrammatic representation of a air conditioning system embodying the present invention.

DESCRIPTION OF THE PREFERRED EMBODIMENT

The preferred embodiment of the invention diagrammatically illustrated in the drawing includes an air conditioning system in which return air from a work-space is normally recycled as recirculation air, but may be mixed with more or less fresh air and passed through a washer to dissipate the room heat added during its passage through the work space. The recirculation air is mixed with fresh air and passed through a washer and humidifier back to the work space. To this end, the return air from the work space, as shown by the arrow 11, is drawn through a return duct 12 having a filter 13 by a recirculating fan 14. A part of the return air is discharged to the atmosphere as indicated by the arrow 15 through a discharge duct section 16, and the remainder is recirculated through a recirculation duct 17 as indicated by the arrow 18. The proportion between recirculated air and exhausted air is regulated by oppositely-acting dampers 21 and 22 respectively in the ducts 16 and 17.

A heating element 23 is provided in the duct 17, preferably in advance of the damper 22. Fresh air 24 is mixed with the recirculated air issuing from the duct 17 by an inlet duct 25 controlled by a damper 26 which is coupled to the dampers 21 and 22. A blower 27 is provided to drive the mixture of fresh and recirculated air into the primary air duct 28 having a washer section 29 and a dewpoint sensor 30. As an alternative, the heater may be positioned upstream of the air washer 29 in the duct 28, preferably upstream of the blower 27. The primary air from the washer 29 is fed to the work space as indicated by the arrow 31 through suitable workspace air inlets (not shown).

The air washer 29 is of conventional configuration having oppositely-directed sprays 32 and 33 controlled respectively by spray valves 34 and 35. Downstream of these sprays 32 and 33 is a drop collector 36 for obtaining a thorough mixing of the air stream and separating free moisture from the air stream into a sump 37 for recirculation of the spray pump 39. A water inlet valve 40 is provided to supply chilled water to control the temperature of the water in the spray used to humidify the primary air flowing through the duct 28. Valve 38 is shown in the drawing, but under normal conditions it is not needed and is eliminated. The water supplied through the valve 40 as indicated by the arrow 41 is preferably from a chill water supply whose temperature is substantially below the temperature of the primary air.

Sensible heat may be added to the system by the heater 23 in the return duct 17 or mixed air duct 28. To control the added heat, a heating controller 43 modulates the heater 23. In the present instance the heater 23 is a coil-type heat exchanger which is supplied by hot water or steam 44 under the control of a control valve 43. Alternatively the heater 23 may be an electrical heater, in which case the control 43 is an electrical controller. Other heating elements are also contemplated, dependent upon the energy sources available in the work-space area.

In accordance with the invention, the dampers 21, 22 and 26, and the chill water supply valve 40 are controlled by the dewpoint sensor 30 through a controller 51. The heater control 43 and the spray controls 34 and 35 are controlled by a thermostat 52 and humidistat 53 in the work-space. The thermostat 52 is a reverse-acting thermostat transmitting a signal inversely proportional to the work-space dry-bulb temperature. Conversely, the humidistat 53 is a direct-acting humidistat which transmitts a signal directly proportional to the work-space relative humidity. The outputs of the thermostat 52 and humidistat 53 are directed to a signal selector control 54 which is operable to put out two separate signals in response to the input signals from the thermostat and humidistat.

As shown in the drawing, the signal selector control 54 has an output which is responsive to the higher of the two inputs to control the heating control 43 and a second output which responds to the lower of the inputs to control the throttling spray valves 34 and 35.

The dewpoint sensor control 51 controls the valve 40 or the dampers 21, 22 and 26. Manipulating the dampers controls the mixture of fresh air with recirculated air. The fresh air 24 has a substantially lower dry bulb temperature and dewpoint temperature than the recirculated air and thus the mixture of fresh air 24 with recirculated air 18 is effective to reduce the dry bulb temperature and the dewpoint temperature of the recirculated air so that the air entering the air washer 29 is dryer than the recirculated air 18. The dewpoint control 51 may alternately affect the valve 40 admitting chilled water to the sprays and to reduce the temperature of the water to increase the cooling effect of the washer. By controlling these elements, the dewpoint sensor control 51 is effective to maintain the dewpoint of the air entering the work space at a substantially constant level, regardless of its dry bulb temperature and relative humidity.

When the room heat is reduced to require heating of the primary air 31, its temperature is increased by heating the recirculated air 18 in the heater 23 in response to the high signal output of the selector control 54. The humidity of the primary air issuing into the work space is modulated by the spray throttle valves 34 and 35 which operate in response to the low signal output of the selector control 54.

In accordance with the invention, the selector 54 is effective to achieve the desired control of the room conditions and also to compensate for abnormal conditions caused by the reduction in the room heat added to the conditioned air.

The selector 54 operates to initiate heating of the recirculated air 18 when either the humidity or the temperature of the room air deviates from the preselected levels by a preset amount, for example, if using a pneumatic control system having proportional pressure outputs, when either of the pressure outputs exceeds 10 psi. In normal sequencing, the sprays are throttled to their minimum output by the low pressure side of the selector 54 before the high pressure side of the selector activates the heating control. Thus, although fed with the higher signal output of the thermostat and the humidistat, the heater 23 is not energized until such time as there is a substantial preset deviation from the preselected conditions of temperature and relative humidity in the work space.

Prior to activation of the heater the lower of the two outputs is effective to activate the throttling valves 34 and 35 to modulate the cooling effect and the humidification accomplished in the washer 29. For example in the pneumatic control system a pressure of 9 psi is sufficient to throttle the sprays 32 and 33 to a minimum level, reducing the cooling effect and the humidification.

Upon energization of the heater, sensible heat is added to the recirculated air without affecting its dewpoint temperature, thereby further reducing the relative humidity. If the increased heat in the primary air is sufficient to maintain the preselected dry bulb temperature in the work space, under abnormal conditions the relative humidity in the work space may rise above the preselected value. To counteract this, the present invention provides means for increasing the flow in the washer to return the relative humidity to the preselected level. The low signal output of the selector 54 (derived from the humidistat 52) will open the throttling valves when the relative humidity rises. With increased flow through the washer 29, a reduction in the temperature of the primary air is offset by increased heat supplied by the heater 13 under the high pressure control of the dry bulb thermostat. Thus the system assures a continued maintenance of the preselected conditions regardless of fluctuations in the room heat.

On the other hand if there is a substantial reduction in the moisture content of the air in the room without an accompanying change in dry bulb temperature, for example due to a radical change in the outdoor weather conditions, the low pressure side of the selector will not effect throttling of the sprays while heat is being added to the recirculated air by the heaters 23. This condition prevails only until such time as the temporary conditions causing this effect are present.

Under normal operating conditions, the control 51 maintains the desired absolute moisture in the primary air 31. When the dewpoint temperature or absolute humidity rises in the air 31, either the dampers 21, 22 and 26 are manipulated to introduce cooler and drier air, or the valve 40 is opened from its normally closed position to add chilled water to the system to cool the air 31 further. When dewpoint temperature or absolute humidity fall, the reverse procedure is effected reducing the decrease of the temperature through the washer 29.

In consideration of the control system shown in the drawing, it should be born in mind that the present invention is directed to a system for controlling the air condition in a work space which is a factory area having substantial heat-generating equipment which does not introduce or withdraw moisture from the atmosphere. Thus the dewpoint temperature of the room air does not vary significantly from a constant level determined by the preselected temperature and relative humidity. The air washer 29 is controlled by the dewpoint sensor 30 and control 51 to maintain the dewpoint temperature of the air leaving the washer at substantially the same dewpoint temperature which is prevelant in the work space. In normal summer operation, the dampers 21 and 26 are closed so that substantially all of the room air 11 is recirculated through the washer 29 with only the leakage through the dampers introducing fresh air. The room heat picked up by the return air 11 is dissipated by the use of chilled spray water in the air washer which removes the sensible heat from the air passing through the washer.

The chilled water introduced by the valve 40 reduces the temperature of the air through the washer 29 as the air is humidified by the sprays. In this fashion the dewpoint sensor is effective to maintain the dewpoint temperature of the air introduced into the work space at a constant level substantially equal to that desired in the work space. In the winter, when the outside air is sufficiently colder than the room air to afford efficient cooling of the recirculated air by mixing outside air with the recirculated air, the dewpoint sensor controls the dampers to determine the proper mixture of outside air with recirculated air to provide a constant dewpoint in the air entering the work space.

When viewed on a psychrometric chart, the primary air is introduced into the work space with a dewpoint temperature corresponding to the dewpoint temperature determined by the preselected relative humidity and dry bulb temperature of the room air, but at a lower dry bulb temperature than the preselected dry bulb temperature in the work space so that the primary air may absorb heat from the room as it mixes with the existing air surrounding the machinery or other heat-producing means in the work space. On the psychrometric chart the mixture of the primary air and the absorbtion of heat from the work space causes the air to follow a horizontal line on the chart to approach the preselected room conditions. After the air assumes the room conditions, it is exhausted into the conditioning system of the present invention as indicated at 11 at a dry bulb temperature and relative humidity corresponding to the preselected levels in the work space. The air passes through the filter 13 and through the recirculating duct 17 where it mixes with the fresh air entering through the damper 26 and enters the primary air duct 28. If the heater 23 is operative to add heat to the recirculating air, the recirculating air follows a horizontal line to a higher dry bulb temperature on the psychrometric chart. Upon its mixture with fresh air, the condition of the air is indicated by a point along the line between the conditions representative of the outside air respectively and the heated recirculation air, thereby reducing both the dewpoint temperature and the dry bulb temperature of the recirculation air. Passage of the air through the washer so as to return the air to its dewpoint temperature raises the dewpoint temperature and lowers the dry bulb temperature, keeping the wet bulb temperature substantially constant.

Under normal winter conditions the room heat supplies more sensible heat to the air than is lost in the air washer so that outside air is mixed with the recirculated air in advance of the washer to maintain the dewpoint temperature at the desired level. When machinery is shut down, however, the amount of room heat added to the air is reduced. Thus the recirculated air has a lower dry bulb temperature and accordingly an increased relative humidity. The increased relative humidity calls for a throttling of the sprays in the air washer, and there is a tendency for the dewpoint of the washed air to be reduced. To overcome this the amount of outside air is reduced by the moisture controller, but it is impossible in a practical installation to cut off the outside air completely.

Particularly in the winter time, when the outside air is quite cold and with low absolute moisture, the leakage through the dampers is sufficient to upset the control of the dewpoint temperature by the absolute moisture controller 51.

In such an abnormal situation, the leakage through the dampers provides a degree of fresh air to mix with the recirculated air, normally about 5%, and this leakage may reduce the temperature of the primary air so that when it passes through the air washer, it does not achieve the dewpoint temperature necessary to maintain the desired room condition.

As the room heat load drops, the selector 54 first causes the sprays in the washer to be throttled back to maintain the room conditions at the reduced heat load. As the sprays are throttled, the efficiency of the spray to maintain the desired dewpoint temperature is reduced and thus the dewpoint temperature drops while the room relative humidity decreases. When the heating of the return air is initiated by the selector 54, after the spray valve is fully throttled, bringing the temperature of the room up to the desired level can reduce the relative humidity below the desired level.

In accordance with the control system shown in the FIGURE, the selector 54 actuates both the heating unit and the spray valve. The selector 54 enables the low pressure output from the humidistat 53 to reduce the throttling of the sprays and restore their humidification effect while the heater 23 remains energized by high pressure output from the thremostat 52.

The system will also work if the heating valves are changed from normally closed to normally open, the spray valves are changed from normally open to normally closed, the thermostat is changed from reverse acting to direct acting, the humidistat is changed from direct acting to reverse acting and the selector relay sends the lower signal to the heating valves and the higher signal to the spray throttling valves.

Thus the present invention provides a fully effective control system for maintaining a selected dry bulb temperature and relative humidity in a work space by the use of an air washer and heater positioned in the recirculated air duct.

While a particular embodiment of the invention has been herein illustrated and described it is not intended to limit the invention to such disclosure but changes and modifications may be made therein and thereto within the scope of the following claims.

I claim:

1. In an air conditioning system to maintain a selected dry bulb temperature and relative humidity in a work space, said system having an air washer with an inlet connected to damper-controlled recirculated-air and fresh-air ducts and an outlet connected to work-space inlets, an absolute moisture controller connected to said dampers and operable normally to maintain the dewpoint temperature in said outlet at a substantially constant level, and throttling means to modulate the flow of water through said washer;

heater means in a duct upstream of said air washer and a heat controller to modulate the heating effect of said heating means; and a humidistat and a thermostat in said work space connected to a selector;

said selector operable upon an increase in the relative humidity or reduction in the dry bulb temperature from said selected values to first operate said throttling means to reduce the flow of water and thereafter to activate said heat controller to add heat to the recirculated-air duct, and operable thereafter upon reduction in the relative humidity or an increase in the dry bulb temperature to inactivate the heat controller prior to inactivating said throttling means.

2. A system according to claim 1 wherein said thermostat is reverse acting operable to put out a first signal inversely proportional to the dry bulb temperature and said humidistat is direct-acting operable to put out a second signal directly proportional to the relative humidity, said selector being operable to activate said heat controller when at least one of said signals exceeds a preset value, and to inactivate the controller when neither signal exceeds said preset value.

3. A system according to claim 2 wherein said selector connects said heat controller to the higher of said two signals and said throttling means to the lower of said two signals, said throttling means being activated and inactivated by a preselected signal below said preset value.

4. A system according to claim 3 wherein said throttling means is responsive to signals ranging from zero to a level less than said preset value to vary the pressure of said sprays from a maximum to a minimum.

5. A system according to claim 1 wherein said work space includes means adding variable amounts of heat to the air in the work space.

6. A method of maintaining a selected dry bulb temperature and relative humidity in a work space comprising the steps of generating a first signal proportional to the dry bulb temperature of the work space and a second signal proportional to the relative humidity of the work space, withdrawing room air from said work space, mixing at least a portion of said room air with fresh air to produce a mixture of primary air, driving said primary air through an air washer having a dewpoint sensor tending to maintain the dewpoint temperature of the primary air leaving the washer substantially constant, introducing said primary air into the work space, throttling the spray in said washer in response to signals indicating a high humidity and a low dry bulb temperature, and thereafter heating the recirculated room air prior to mixing it with fresh air when the signals indicate that the throttling is not effective to maintain said selected conditions.

7. A method according to claim 6 wherein the first signal is inversely proportional to the dry bulb temperature and the second signal is directly proportional to the relative humidity, so that falling dry bulb temperature and rising relative humidity generates increasing signals, and rising dry bulb temperature and falling relative humidity generates decreasing signals, and controlling said heater by the higher of said two signals when it exceeds a preset limit, and contolling the throttling of said sprays by the lower of said two signals whereby said sprays are controlled alone by the lower of said two signals.

8. A method according to claim 7 in which the throttling of said spray is either increased or decreased by the lower of said two signals during the heating of said recirculated room air under the control of the higher of said two signals.

9. A method of maintaining preselected room air conditions, namely the dry bulb temperature and the wet bulb temperature, in a work space having heat-generating means comprising
   recirculating the room air through a heater and an air washer, removing heat and adding humidity to the air in said washer,
   sensing the dry bulb temperature and the relative humidity of said room air,
   sensing the dewpoint temperature of the air leaving said washer,
   controlling the washer to counteract changes in the dewpoint temperature and to counteract changes in said room air conditions, and adding heat to the recirculated air upstream of said washer when the room air conditions deviate from said preselected conditions by a given amount.

10. A method according to claim 9 including the step of controlling the washer independently prior to adding heat to maintain said preselected room conditions.

11. A method according to claim 10 wherein the controlling of the washer in response to the room conditions is continued after adding heat to maintain said selected room conditions.

* * * * *